(12) United States Patent
Schleif et al.

(10) Patent No.: US 11,925,991 B2
(45) Date of Patent: Mar. 12, 2024

(54) SYSTEM AND METHOD FOR MACHINING A SLOT IN AN INNER SURFACE OF A CASING FOR A GAS TURBINE ENGINE

(71) Applicant: GENERAL ELECTRIC COMPANY, Schenectady, NY (US)

(72) Inventors: Kurt Kramer Schleif, Greenville, SC (US); Fabian Gubelmann, Winterhur (CH); Andrew David Ellis, Simpsonville, SC (US); Robert David Jones, Simpsonville, SC (US); Thomas Gloor, Rupperswil (CH); Roman Stefan Peter, Mettau (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/864,854

(22) Filed: Jul. 14, 2022

(65) Prior Publication Data
US 2022/0362865 A1  Nov. 17, 2022

Related U.S. Application Data

(63) Continuation of application No. 16/668,846, filed on Oct. 30, 2019, now Pat. No. 11,400,527.

(51) Int. Cl.
*B23C 3/34* (2006.01)
*B23C 3/02* (2006.01)
*B23Q 9/00* (2006.01)

(52) U.S. Cl.
CPC .................. *B23C 3/34* (2013.01); *B23C 3/02* (2013.01); *B23Q 9/0035* (2013.01);
(Continued)

(58) Field of Classification Search
CPC . Y10T 409/304424; Y10T 409/306384; Y10T 409/30644; Y10T 409/306496;
(Continued)

(56) References Cited

U.S. PATENT DOCUMENTS 2,623,552 A   12/1949  Compton et al.
3,285,137 A   11/1966  Hill et al.
(Continued)

FOREIGN PATENT DOCUMENTS

CA   2489629 A1   6/2005
EP   2378259 A1   10/2011
(Continued)

*Primary Examiner* — Erica E Cadugan
*Assistant Examiner* — Michael Vitale
(74) *Attorney, Agent, or Firm* — Fletcher Yoder, P.C.

(57) ABSTRACT

A milling device for machining a slot into an inner surface of a casing for a gas turbine engine. The milling device includes a frame assembly including multiple structural guides configured to engage structural features on the inner surface of the casing to maintain an axial position of the milling device relative to a longitudinal axis of the casing. The milling device also includes a milling cutter coupled to the frame assembly. The milling device is configured to be displaced in a circumferential direction relative to the longitudinal axis to machine the slot, via the milling cutter, along the inner surface of the casing in the circumferential direction.

12 Claims, 12 Drawing Sheets

(52) U.S. Cl.
CPC ...... *B23C 2220/36* (2013.01); *B23C 2270/18* (2013.01); *F05D 2230/10* (2013.01); *Y10T 409/304424* (2015.01); *Y10T 409/30644* (2015.01)

(58) Field of Classification Search
CPC ...... B23Q 5/045; B23Q 5/046; B23Q 9/0021; B23Q 9/0035; B23Q 9/0057; B23Q 9/02; B23C 3/02; B23C 3/124; B23C 3/24; B23C 2220/36; B23C 2230/10; B23C 2220/363; B23C 2220/366; B23C 2220/40; B23C 2270/18; B23P 6/00; F05D 2230/10; F01D 25/285; B24B 23/08
USPC .................................. 409/143, 178, 179, 180
See application file for complete search history.

(56) References Cited

U.S. PATENT DOCUMENTS

| | | | |
|---|---|---|---|
| 3,442,309 A | 5/1969 | Jentsch | |
| 3,604,940 A | 9/1971 | Matthews | |
| 3,605,729 A | 9/1971 | Liu et al. | |
| 3,766,387 A | 10/1973 | Heffan et al. | |
| 3,835,591 A | 9/1974 | Cimprich | |
| 3,908,444 A | 9/1975 | Peter | |
| 4,021,119 A | 5/1977 | Stauffer | |
| 4,092,537 A | 5/1978 | Stewart | |
| 4,326,804 A | 4/1982 | Mossey | |
| 4,395,827 A | 8/1983 | Stowe et al. | |
| 4,558,686 A | 12/1985 | Ono et al. | |
| 4,566,225 A | 1/1986 | Bizot et al. | |
| 4,676,648 A | 6/1987 | Schulz et al. | |
| 4,830,449 A | 5/1989 | Spillman, Jr. | |
| 4,845,769 A | 7/1989 | Burstein et al. | |
| 5,005,353 A | 4/1991 | Acton et al. | |
| 5,161,291 A | 11/1992 | Guenther | |
| 5,313,513 A | 5/1994 | Prindiville et al. | |
| 5,353,551 A | 10/1994 | Nishida | |
| 7,029,371 B1 | 4/2006 | Bird | |
| 7,802,945 B2 * | 9/2010 | Sheffler | B24D 7/18 407/30 |
| 8,054,939 B2 | 11/2011 | Gordon, III et al. | |
| 8,096,184 B2 | 1/2012 | Twerdochlib | |
| 8,126,254 B2 | 2/2012 | Lasa et al. | |
| 8,157,620 B2 | 4/2012 | Corn et al. | |
| 8,381,379 B2 | 2/2013 | Holmes et al. | |
| 8,444,377 B2 | 5/2013 | Kottilingam et al. | |
| 9,261,384 B2 | 2/2016 | Schleif et al. | |
| 9,458,735 B1 | 10/2016 | Diwinsky et al. | |
| 9,494,490 B2 | 11/2016 | Tralshawala et al. | |
| 9,623,492 B2 | 4/2017 | Capriotti et al. | |
| 10,030,811 B2 | 7/2018 | Schleif et al. | |
| 10,180,079 B2 | 1/2019 | Schleif et al. | |
| 10,921,113 B1 | 2/2021 | Schleif et al. | |
| 11,060,847 B2 | 7/2021 | Schleif et al. | |
| 2004/0042858 A1 * | 3/2004 | Sheffler | B24D 7/18 409/32 |
| 2005/0159079 A1 | 7/2005 | Astigarraga Castanares et al. | |
| 2005/0198821 A1 | 9/2005 | Reville et al. | |
| 2006/0056960 A1 | 3/2006 | Sabol et al. | |
| 2007/0041834 A1 | 2/2007 | Schram et al. | |
| 2010/0074727 A1 | 3/2010 | Twerdochlib | |
| 2010/0159814 A1 * | 6/2010 | Corn | B24B 19/009 451/552 |
| 2010/0219942 A1 | 9/2010 | Lee | |
| 2010/0290906 A1 | 11/2010 | Moeckel et al. | |
| 2010/0296911 A1 | 11/2010 | McCallum | |
| 2011/0116908 A1 | 5/2011 | Thies | |
| 2011/0229307 A1 | 9/2011 | Lemieux et al. | |
| 2012/0182563 A1 | 7/2012 | Kominsky | |
| 2012/0325790 A1 | 12/2012 | Chida et al. | |
| 2013/0051947 A1 | 2/2013 | Holmes et al. | |
| 2013/0322973 A1 | 12/2013 | Holmes | |
| 2014/0069460 A1 | 3/2014 | Kell et al. | |
| 2014/0376590 A1 | 12/2014 | Hwang et al. | |
| 2015/0011322 A1 | 1/2015 | Schleif et al. | |
| 2015/0322813 A1 | 11/2015 | Tralshawala et al. | |
| 2016/0084637 A1 | 3/2016 | John | |
| 2016/0096249 A1 | 4/2016 | Visajtaev | |
| 2016/0123528 A1 | 5/2016 | Schleif et al. | |
| 2016/0210845 A1 | 7/2016 | Shaw et al. | |
| 2018/0056406 A1 | 3/2018 | Mery et al. | |
| 2018/0202312 A1 | 7/2018 | Schleif et al. | |
| 2018/0283960 A1 | 10/2018 | Gordan et al. | |
| 2018/0340441 A1 | 11/2018 | Miyamoto et al. | |
| 2019/0353473 A1 | 11/2019 | Warren et al. | |
| 2019/0368382 A1 | 12/2019 | Carter et al. | |
| 2020/0391332 A1 * | 12/2020 | Schleif | B23Q 9/0057 |
| 2021/0132254 A1 | 5/2021 | Schleif et al. | |
| 2021/0132598 A1 | 5/2021 | Schleif et al. | |

FOREIGN PATENT DOCUMENTS

| | | | |
|---|---|---|---|
| GB | 1080726 A | 8/1967 | |
| KR | 20040064441 A | 7/2004 | |
| WO | 2005016582 A1 | 2/2005 | |
| WO | WO-2009109422 A1 * | 9/2009 | ............... B23C 3/30 |
| WO | WO-2015063750 A1 * | 5/2015 | ............ B23Q 35/103 |
| WO | 2019177474 A1 | 3/2018 | |

* cited by examiner

SYSTEM AND METHOD FOR MACHINING A SLOT IN AN INNER SURFACE OF A CASING FOR A GAS TURBINE ENGINE

CROSS-REFERENCE TO RELATED APPLICATIONS

This application is a continuation of U.S. patent application Ser. No. 16/668,846, entitled "SYSTEM AND METHOD FOR MACHINING A SLOT IN AN INNER SURFACE OF A CASING FOR A GAS TURBINE ENGINE," filed Oct. 30, 2019, which is herein incorporated by reference in its entirety for all purposes.

BACKGROUND

The subject matter disclosed herein relates to a gas turbine system and, more particularly, to a system and method for machining a slot into a casing of the gas turbine system.

Gas turbines are used to generate power for various applications. Typically, testing and validation are performed on these gas turbines prior to their utilization (e.g., in a power generating station). Effective testing and validation can increase the efficiency of and productivity of the gas turbines as well as the power generating station. However, the installation of equipment for performing the testing and validation on the gas turbine engine may be labor intensive and time consuming.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a milling device for machining a slot into an inner surface of a casing for a gas turbine engine is provided. The milling device includes a frame assembly including multiple structural guides configured to engage structural features on the inner surface of the casing to maintain an axial position of the milling device relative to a longitudinal axis of the casing. The milling device also includes a milling cutter coupled to the frame assembly. The milling device is configured to be displaced in a circumferential direction relative to the longitudinal axis to machine the slot, via the milling cutter, along the inner surface of the casing in the circumferential direction.

In another embodiment, a sled milling device is provided. The sled milling device includes a frame assembly and a milling cutter coupled to the frame assembly. The sled milling device also includes a bearing support configured to interface with an inner surface of casing of a gas turbine engine, to provide a supporting force in a direction perpendicular to a longitudinal axis of the casing, and to enable movement of the sled milling device in a circumferential direction relative to the longitudinal axis. The sled milling device is configured to be displaced in the circumferential direction to machine a slot, via the milling cutter, along the inner surface of the casing in the circumferential direction.

In a further embodiment, a milling system for machining a slot into an inner surface of a casing for a gas turbine engine is provided. The milling system includes a sled milling device that includes a frame assembly and a milling cutter. The sled milling device is configured to be displaced in a circumferential direction relative to a longitudinal axis of the casing to machine the slot, via the milling cutter, along the inner surface of the casing in the circumferential direction, wherein the frame assembly is configured to be interchangeably coupled to different sets of structural guides. Each set of structural guides includes a different size, shape, or a combination thereof, to enable the sled milling device to engage different structural features on the inner surface of the casing to maintain an axial position of the milling device relative to a longitudinal axis of the casing. The milling system also includes the different sets of structural guides.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
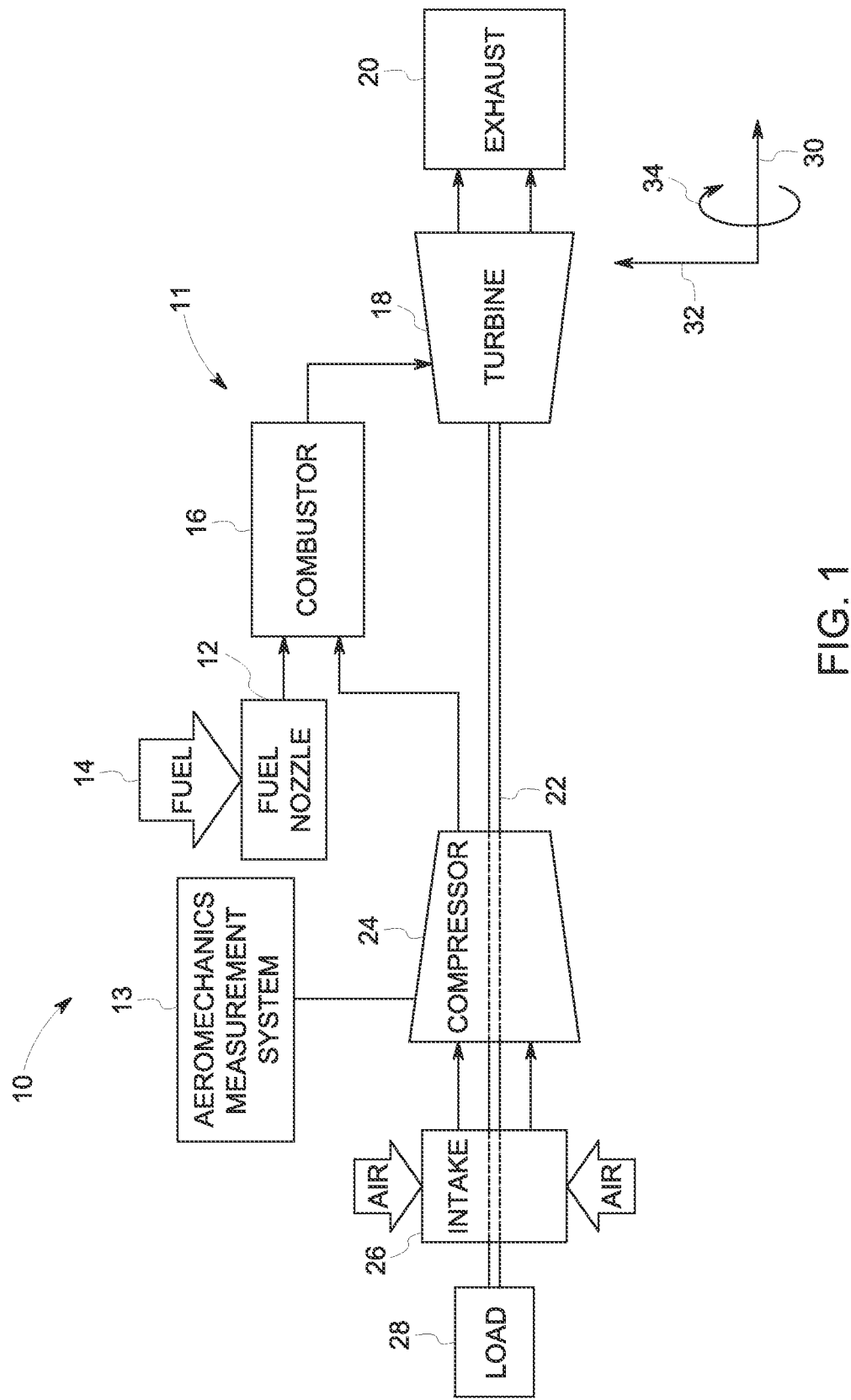
FIG. 1 is a block diagram of an embodiment of a turbine system having an aeromechanics measurement system.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include a milling system for milling a slot (e.g., circumferential slot) into an inner surface or diameter of a casing (e.g., compressor casing) of a gas turbine engine. The slot extends in a circumferential direction relative to a longitudinal axis of the casing or gas turbine engine. The slot is configured to receive a circumferential track that defines a cavity for receiving a measurement system (e.g., having a plurality of sensors) for validating the operation of the gas turbine engine. The milling system includes a milling device or tool (e.g., a sled-style milling device or tool) that includes a frame assembly and a milling cutter (e.g., end mill cutter or bit) coupled to the frame assembly. The frame assembly includes or is coupled to structural guides that are configured to engage structural features (e.g., slots or retention lobes on structural features (e.g., protrusions) that define slots for retaining compressor stator vanes) on the inner surface of the casing to maintain an axial position of the milling device relative to the longitudinal axis. The frame assembly may be interchangeably coupled to different sets of structural guides (e.g., where the size and/or shape of the structural guides vary between sets), where each set of structural guides is designed to engage structural features on the inner surface of the casing having different sizes and/or shapes. The milling device is configured to be displaced (e.g., via a force applied by an operator) in the circumferential direction along the inner surface of the casing to machine the slot via the milling cutter. In certain embodiments, the milling device includes a bearing support that interfaces with the inner surface of the casing that provides a supporting force in a direction perpendicular to the longitudinal axis while enabling movement of the sled milling device in a circumferential direction. The architecture of the milling device enables it to be adapted to and utilized on the inner surface of any casing (e.g., circular or semi-circular casing) of a gas turbine engine that has casing features near an area to be milled. The milling device also enables precise alignment of the milling or cutting tool to create the circumferential slot utilizing the casing features. The milling device may even be utilized on casings that are damaged, warped, or worn. In addition, the milling device is highly transportable due to its small size and light weight and may be utilized by a single person to machine the slot.

Turning to the figures, FIG. 1 is a block diagram of an embodiment of a turbine system 10 having a gas turbine engine 11. For reference, the gas turbine engine 11 may extend in axial direction 30 (e.g., relative to a longitudinal axis 36 of gas turbine engine 11 or casing 42, see FIG. 2), a radial direction 32 toward or away from the longitudinal axis 36, and a circumferential direction 34 around the longitudinal axis 36. The disclosed turbine system 10 employs a measurement system 13 (e.g., aerodynamics measurement system) whose installation and use are made possible due to a milling system described in greater detail below. The measurement system 13 may include a sensor assembly having a plurality of sensors that measure a variety of operational parameters utilized to provide baseline data in validating the operation of the gas turbine engine 11. The measurement system 13 operates independent of the control system for the gas turbine engine 11. The number of sensors may range from dozens to a hundred to thousands of sensors. At least some of the sensors may employ optics and/or fiber optics. The operational parameters measured may include blade tip timing (e.g., for displacement, stress, frequency, etc.), blade tip clearance, temperature, dynamic pressure, static pressure, rotor vibration, stall detection, and rotor speed.

The sensor assembly is disposed within a space or cavity defined by a circumferential track embedded within a circumferential slot along an inner surface or diameter of a casing (e.g., compressor casing) of the gas turbine engine 11. The circumferential track and slot extends in the circumferential direction 34 relative to a longitudinal axis 36 of the gas turbine engine 11. In certain embodiments, the casing may include a plurality of circumferential tracks (and circumferential slots) spaced apart from each other in the axial direction 30. In certain embodiments, the measurement system 13 may include a plurality of sensor assemblies each having a plurality of sensors, where the sensors assemblies may be inserted into multiple circumferential tracks.

The circumferential slots need to have a certain profile to receive the embedded sensor track system. A milling system that includes a milling device (e.g., a sled-style milling system) is utilized to machine the circumferential slots. The milling device utilizes existing casing structural features (e.g., protrusions that define retention lobes or slots for retaining compressor stator vanes) on the inner surface of the casing near the area to be milled or machined as both a support for the milling device and a guide for the path of the milling device. The milling device includes a frame assembly and a milling cutter (e.g., end mill cutter or bit) coupled to the frame assembly. The type of cutter utilized with the milling device is interchangeable. The frame assembly includes or is coupled to structural guides that are configured to engage the structural features on the inner surface of the casing to maintain an axial position of the milling device relative to the longitudinal axis. The frame assembly may be interchangeably coupled to different sets of structural guides (e.g., where the size and/or shape of the structural guides vary between sets), where each set of structural guides is designed to engage structural features on the inner surface of the casing having different sizes and/or shapes. Thus, the milling device may be utilized to create different types of slot profiles. The adaptability of the milling device enables it to be utilized on damaged, warped, or worn casings. In addition, the milling device is configured to be displaced (e.g., via a force applied by an operator) in the circumferential direction along the inner surface of the casing to machine the slot via the milling cutter. In certain embodiments, the milling device includes a bearing support that interfaces with the inner surface of the casing that provides a supporting force in a direction perpendicular to the longitudinal axis while enabling movement of the sled milling device in a circumferential direction. The milling device may be utilized on any type of circular or semi-circular casing (e.g., compressor casing, turbine casing, etc.).

The turbine system 10 may use liquid or gas fuel, such as natural gas and/or a synthetic gas, to drive the turbine system 10. As depicted, one or more fuel nozzles 12 intake a fuel supply 14, partially mix the fuel with air, and distribute the fuel and the air-fuel mixture into a combustor 16 where further mixing occurs between the fuel and air. The air-fuel mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
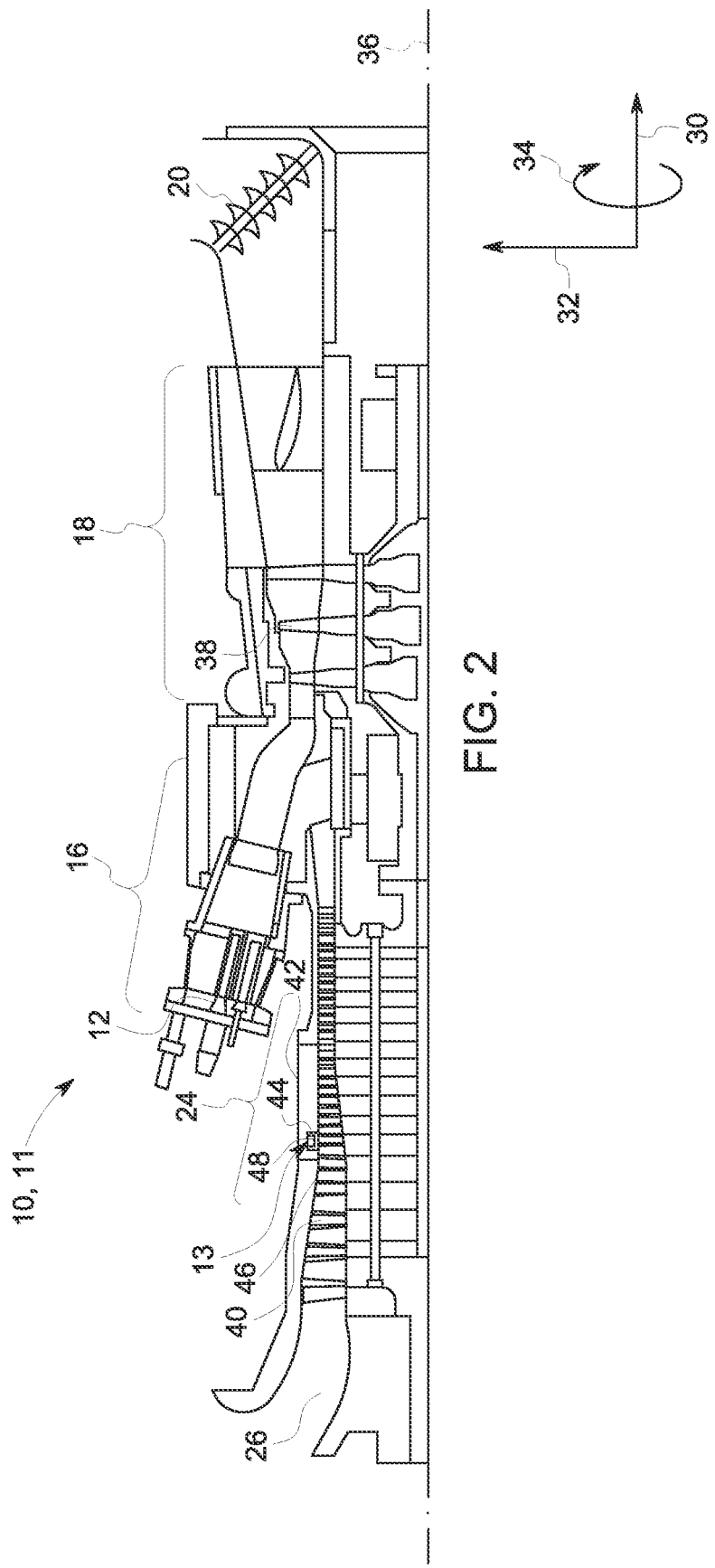
FIG. 2 is a cross-sectional side view of an embodiment of the turbine system, as illustrated in FIG. 1, with the aeromechanics measurement system.

FIG. 2 is a cross-sectional side view of an embodiment of the gas turbine engine 11 as illustrated in FIG. 1. The gas turbine engine 11 has a longitudinal axis 36. In operation, air enters the gas turbine engine 11 through the air intake 26 and is pressurized in the compressor 24. The compressed air then mixes with gas for combustion within the combustor 16. For example, the fuel nozzles 12 may inject a fuel-air mixture into the combustor 16 in a suitable ratio for optimal combustion, emissions, fuel consumption, and power output. The combustion generates hot pressurized exhaust gases, which then drive turbine blades 38 within the turbine 18 to rotate the shaft 22 and, thus, the compressor 24 and the load 28. The rotation of the turbine blades 38 causes a rotation of the shaft 22, thereby causing blades 40 (e.g., compressor blades) within the compressor 24 to draw in and pressurize the air received by the intake 26.

As depicted, a casing 42 (e.g., compressor casing) surrounds the blades 40 (and stator vanes) of the compressor 24. The casing 42 may include multiple sections (e.g., two halves) that together extend completely about the longitudinal axis 36 to define the interior of the compressor 24. A circumferential track 44 is embedded within a slot 45 along an inner surface or diameter 46 of the casing 42. The measurement system 13 includes the sensor assembly 48 having the plurality of sensors disposed within a space or cavity defined between the circumferential track 44 and the inner diameter 46 of the casing 42. The circumferential track 44 is axially 30 disposed between the rows of stator vanes (not shown) so that the circumferential track 44 and, thus, the sensors of the sensor assembly 48 are in the plane of (and axially 30 aligned with) the rotating blades 40. The circumferential track 44 extends in the circumferential direction 34 at least a portion about the inner diameter 46 of the casing 42. In certain embodiments, the circumferential track 44 extends about the entire inner diameter 46 of the casing 42.

Figure 3:
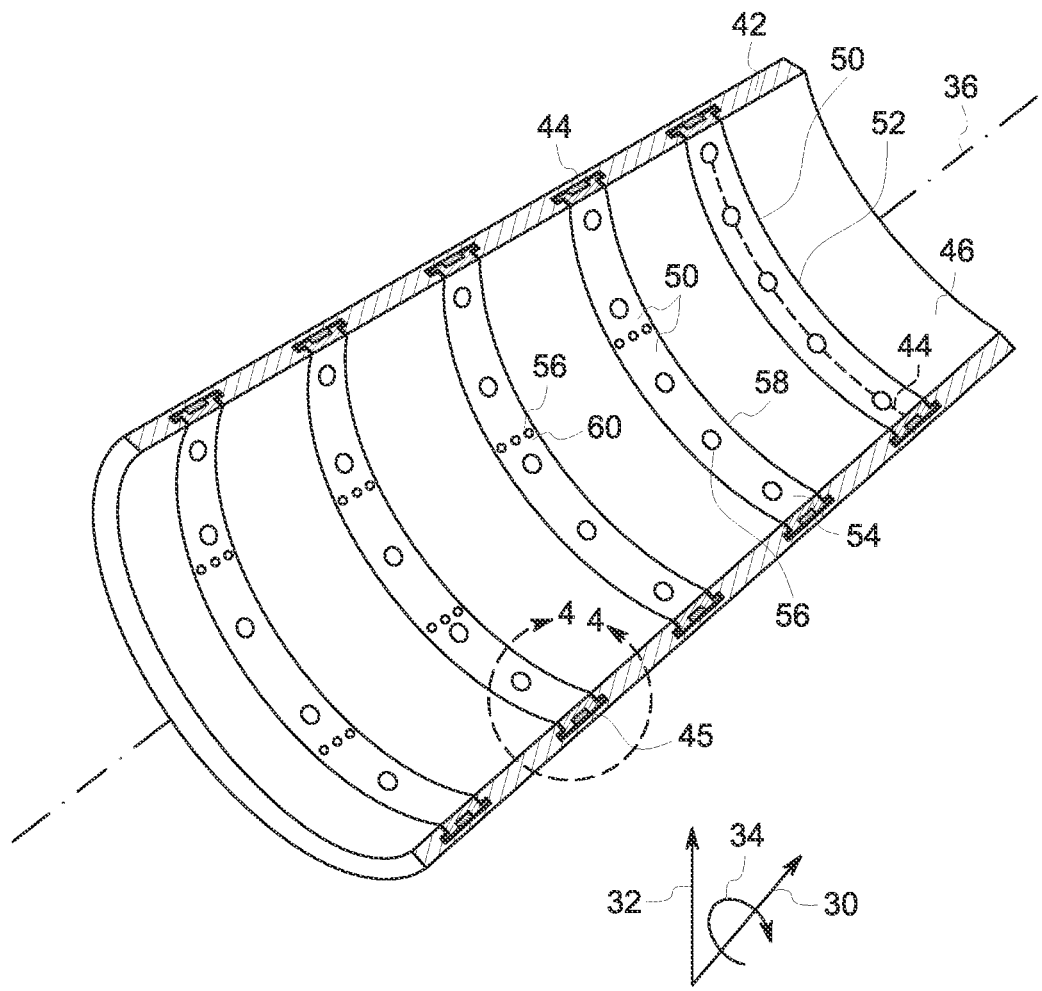
FIG. 3 is a perspective view of an embodiment of an inner surface of a portion of a casing (e.g., compressor casing) for a gas turbine engine having multiple circumferential tracks.

FIG. 3 is a perspective view of an embodiment of the inner surface 46 of a portion of the casing 42 (e.g., compressor casing) for the gas turbine engine 11 having multiple circumferential tracks 44. The stator vanes and the respective slots for receiving them are not shown. In certain embodiments, the number of circumferential tracks 44 may correspond to the number of stages of blades 40. In other embodiments, the number of circumferential tracks 44 may be less than or greater than the number of stages of blades 40. As depicted, the circumferential tracks 44 are axially 30 spaced apart from each other relative to the longitudinal axis 36. As mentioned above, the circumferential track 44 is axially 30 disposed between the rows of stator vanes so that the circumferential track 44 and, thus, the sensors of the sensor assembly 48 are in the plane of (and axially 30 aligned with) the rotating blades 40. The circumferential track 44 extends in the circumferential direction 34 at least a portion about the inner diameter 46 of the casing 42. In certain embodiments, the circumferential track 44 extends about the entire inner diameter 46 of the casing 42.

Figure 4:
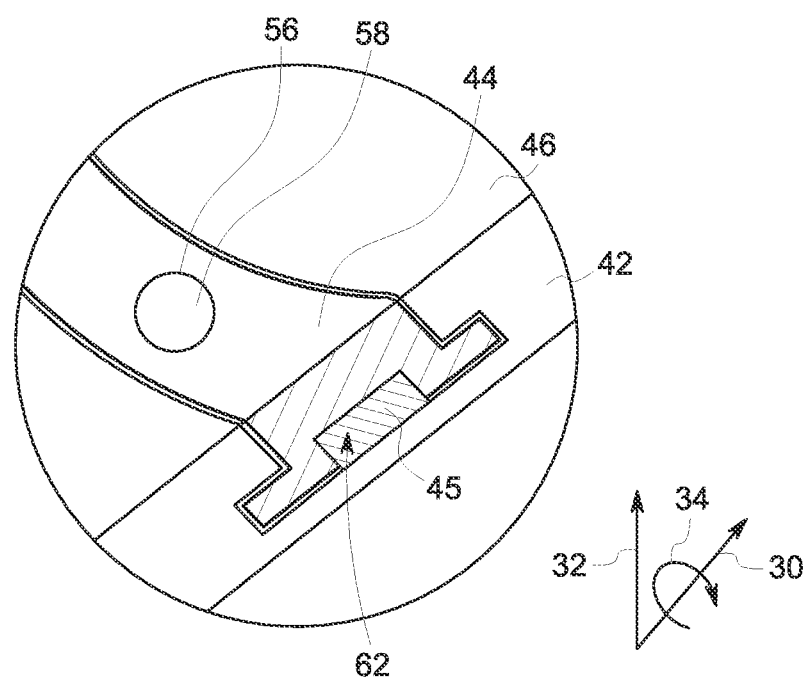
FIG. 4 is a perspective view of an embodiment of a portion of a circumferential track embedded in the inner surface of the casing, taken within line 4-4 of FIG. 3.

In certain embodiments, the circumferential track 44 is a single segment 50 as depicted with circumferential track 52. In other embodiments, the circumferential track 44 may include multiple segments 50 as depicted with circumferential track 54. Each circumferential track 44 includes openings 56 that enable the sensors of the sensor assembly 48 to face toward an interior of the compressor 24 (e.g., toward the blades 40) when the sensor assembly 48 is properly inserted within the space defined by the circumferential track 44 and the inner diameter 46 of the casing 42. The openings 56 may include larger openings 58 and smaller openings 60 sized for specific sensors. In certain embodiments, the openings 56 may be circumferentially 34 aligned or axially 30 aligned. As depicted in FIG. 4, a space or cavity 62 is defined between the circumferential track 44 and the inner surface 46 of the casing 42. The sensor assembly 48 may be inserted into and/or removed from the space or cavity 62.

Figure 5:
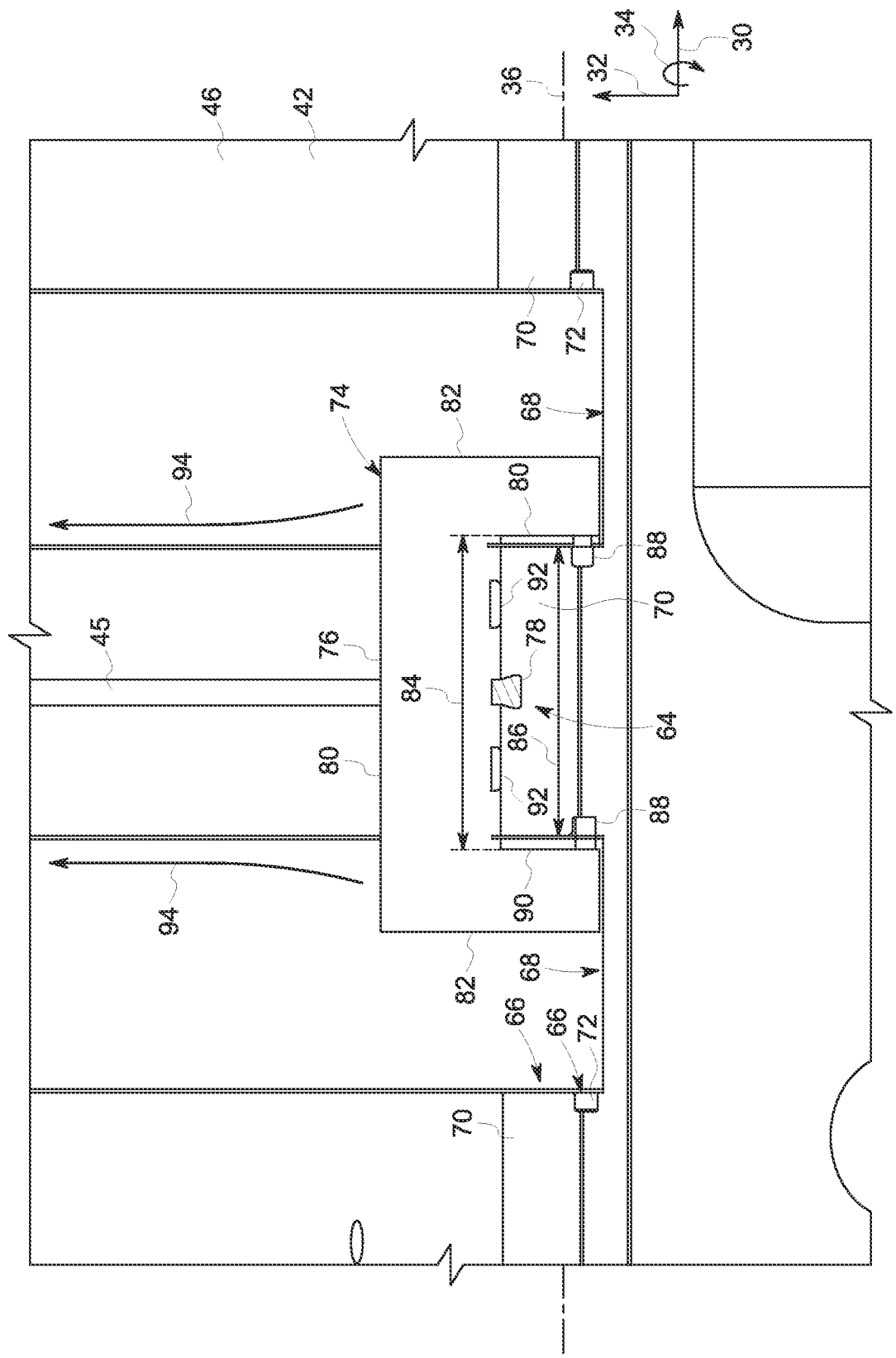
FIG. 5 is a side schematic view of an embodiment of a milling system being utilized to machine a slot along an inner surface of a casing.

FIG. 5 is a side schematic view of an embodiment of a milling system 64 (e.g., machining system) being utilized to machine the slot 45 along the inner surface 46 of the casing 42. As depicted, the inner surface 46 of the casing 42 includes structural features 66. These structural features include slots 68 extending in the circumferential direction 34 for retaining stator vanes (e.g., compressor stator vanes) defined between protrusions 70. The protrusions 70 include retention lobes, slots, or recesses 72 that are utilized in retaining the stator vanes within the slots 68. These structural features 66 may vary in size, shape, or spacing between each other. The milling system 64 utilizes the structural features 66 in both supporting and guiding the milling system 64 in machining the slot 45.

The milling system 64 includes a milling device or tool 74 for machining (e.g., routing, grinding, milling, etc.) the slot 45 (e.g., within the protrusion 70). The milling device 74 includes a frame assembly 76 and a milling cutter or bit 78 (e.g., end mill cutter) coupled to the frame assembly 76 that machines the slot 45. The milling device 74 may be interchangeably coupled to different milling cutters (e.g., roughing end mill, finishing end mill, square end mill, ball end mill, etc.). The milling cutter 78 may be coupled to an electric motor drive coupled to a power source (not shown). As depicted, the frame assembly 76 includes a plate 80 and a pair of rails 82 flanking the plate 80. The plate 80 is horizontally oriented relative to the pair of rails 82 (which extend vertically in the radial direction 32). The milling cutter 78 is coupled to the plate 80. In certain embodiments, the position of the milling cutter 78 along the plate 80 may be adjusted (e.g., to change an axial position of the milling cutter 78 relative to the longitudinal axis 36). The frame assembly 76 is adjustable in size to account for the structural features 66 on the inner surface 46 of the casing 42. In particular, a distance 84 between the rails 82 is adjustable to accommodate for a width 86 of the protrusion 70. As depicted, the milling device 74 extends over the protrusion 70. In certain embodiments, the milling device 74 extends between multiple adjacent protrusions 70.

The milling system 64 includes structural guides 88 coupled to the rails 82. The structural guides 88 are configured to engage the structural features 66 (e.g., retention lobes 72) on the protrusion 70 to maintain an axial position (e.g., relative to the longitudinal axis 36) of the milling device 74. As depicted, the structural guides 88 are disposed on inner surfaces 90 of the rails 82 to engage the retention lobes 72 disposed on opposite sides of the same protrusion 70. In certain embodiments, the structural guides 88 may be disposed on an outer surface of the rails 82 or another portion of the frame assembly 76 to engage a respective retention lobe 72 on different protrusions 70 (e.g., where the different protrusions 70 flank the protrusion 70 where the slot 45 is to be machined). The milling system 64 may include different sets of structural guides 88. Each set of structural guides 88 may be specifically shaped or sized to different structural features 66 of different sizes and/or shapes. The milling device 74 may be interchangeably coupled to the different sets of structural guides 88. This (along with the adjustability of the frame assembly 76) enables the milling device 74 to be coupled to different structural features 66 on any type of circular or semi-circular casing 42 (including those with inner surfaces 46 that are damaged, warped, or worn).

The milling device 74 also includes frictionless support structures 92 that interface with (e.g., contact) the inner surface 46 of the casing 42 (e.g., top of protrusion 70). In certain embodiments, the frictionless support structures 92 act as bearing support. The frictionless support structures 92 provide a supporting force in a direction (e.g., radial direction 32) perpendicular to the longitudinal axis 36. In addition, the frictionless support structures 92 enable movement (as indicated by arrows 94) in the circumferential direction 34 along the inner surface 46 of the casing 42 in response to a force exerted by an operator. Thus, the milling device 74 acts as a sled-style milling device. The small size and the light weight of the milling device 74 enable the milling device 74 to be utilized by a single person to machine the slot 45. In certain embodiments, the frictionless support structures 92 may include spring loaded frictionless pins (e.g., made of plastic, graphite, or some other frictionless material). As depicted, the frictionless support structures 92 extend from a bottom of the plate 80. In other embodiments, the frictionless support structures 92 may extend from another portion of the frame assembly 76 (e.g., the rails 82).

Figure 6:
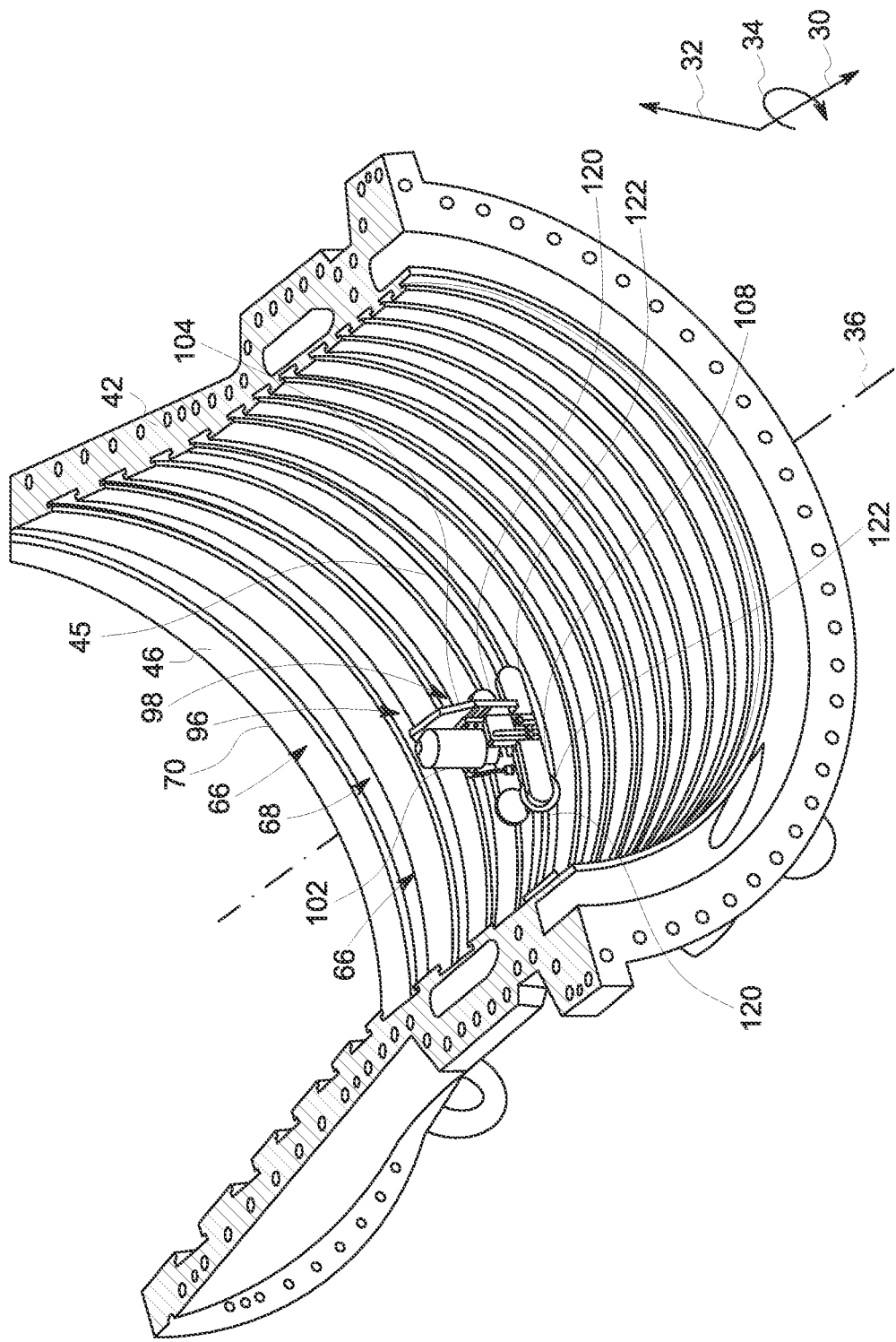
FIG. 6 is a perspective view of an embodiment of a milling device being utilized to machine a slot along an inner surface of a casing.
Figure 7:
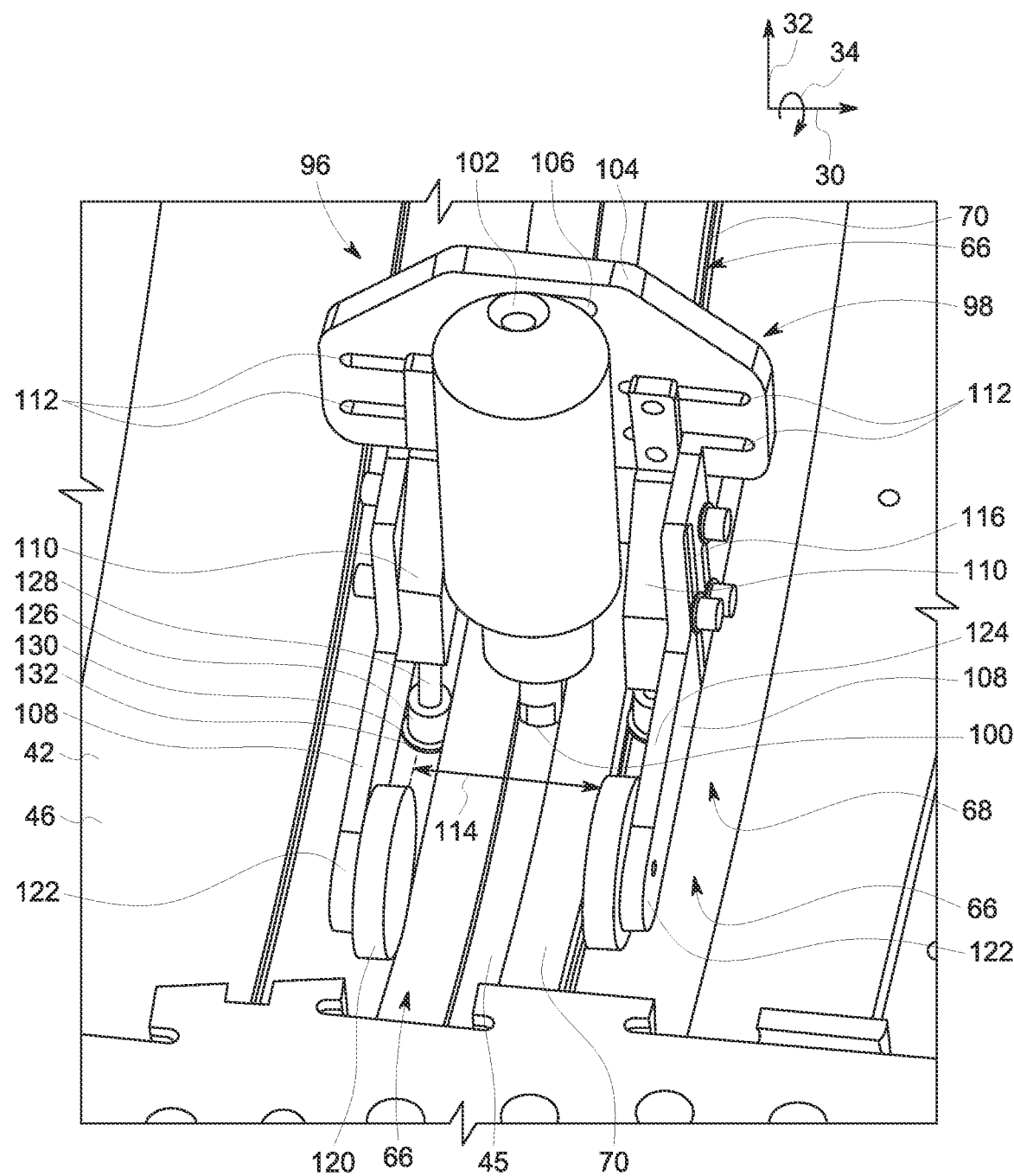
FIG. 7 is a top perspective view of the milling device being utilized to machine the slot in FIG. 6.
Figure 8:
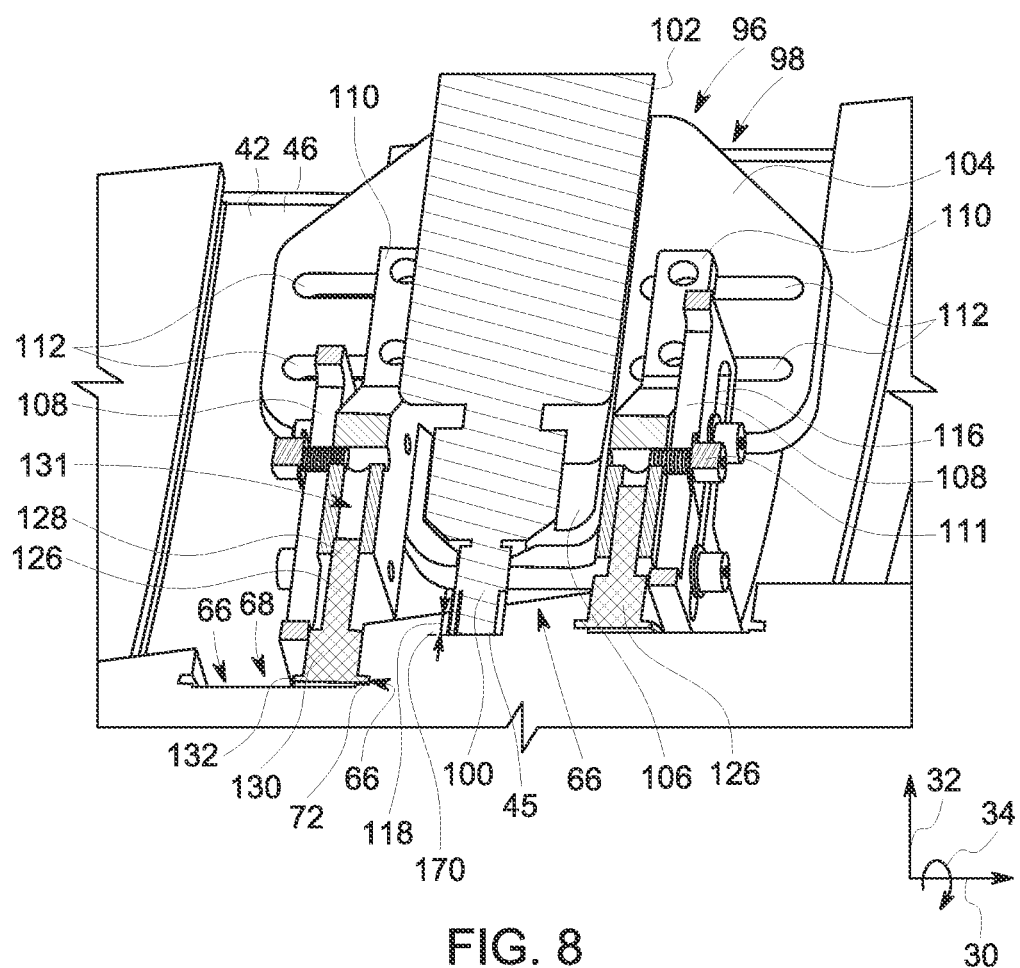
FIG. 8 is a side cross-sectional view of the milling device being utilized to machine the slot in FIG. 6.
Figure 9:
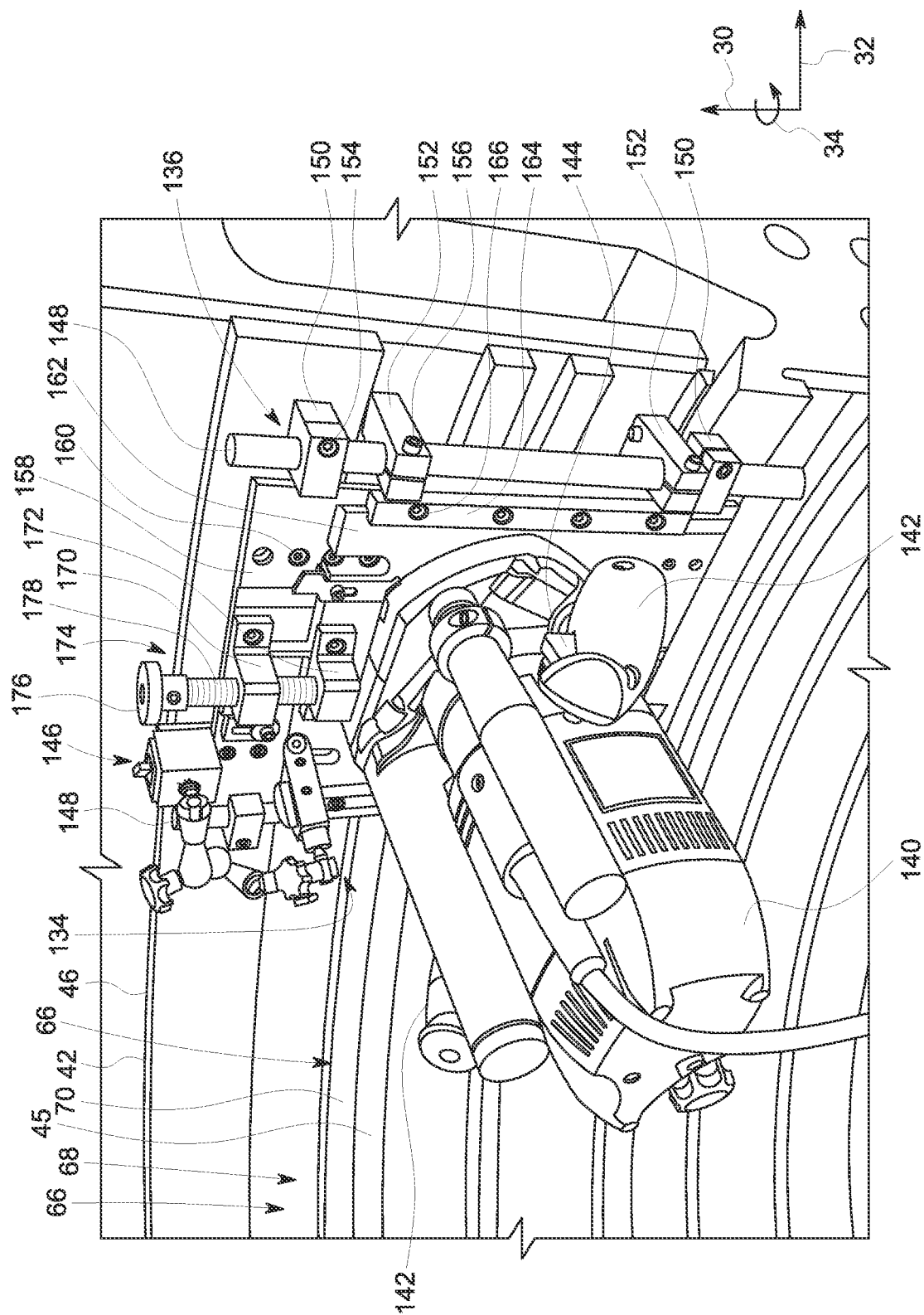
FIG. 9 is a front perspective view of an embodiment of a milling device being utilized to machine a slot along an inner surface of a casing.

FIGS. 6-8 depict a milling device 96 being utilized to machine the slot 45 along the inner surface 46 of the casing 42. The casing 42 and its features are as described with reference to FIG. 5. The milling device 96 includes a frame assembly 98 and a milling cutter or bit 100 (e.g., end mill cutter) coupled to the frame assembly 98 that machines the slot 45. The milling device 96 may be interchangeably coupled to different milling cutters (e.g., roughing end mill, finishing end mill, square end mill, ball end mill, etc.). The milling cutter 100 may be coupled to an electric motor drive coupled to a power source (not shown) disposed within the housing 102.

The frame assembly 98 includes a plate or bracket 104 vertically oriented in the radial direction 32. The milling device 96 is coupled to the support plate 104 via a plate 106. A pair of support arms or rails 108 is coupled to the plate 104 via a pair of respective support brackets 110. The support arms 108 are coupled to the support brackets 110 via fasteners 111 (e.g., bolts). The supports arms 108 and the support brackets 110 flank the milling cutter 100 and extend away from the plate 104. The support brackets 110 are coupled via fasteners (not shown) to respective slots 112 within the plate 104 that flank the plate 106. A width or distance 114 between the support arms 108 can be adjusted by altering the position of the supports arms 108 in the axial direction 30 along the slots 112. The support arms 108 also include slots 116 that enable the position of the supports arms 108 to be adjusted radially 32 relative to the support brackets 110 and, thus, to alter a vertical position of the milling cutter 100 and a depth 118 of the slot 45.

Each support arm 108 is coupled to rollers 120. A respective roller 120 is coupled to the opposing inner surfaces of each end 122 of the support arms 108. Each support bracket 110 is coupled to a support structure 126. The support structures 126 provide a supporting force in a direction (e.g., radial direction 32) perpendicular to the longitudinal axis 36. Each support structure 126 includes a stem portion 128 and an end portion 130. The stem portion 128 is configured to move in the radial direction 32 within a recess 131 within the support structure 126 to enable the support structure 126 to adjust to differences in height of the structural features 66 along the inner surface 46 of the casing 42 (e.g., in the axial direction). As depicted in FIG. 8, the support structures 126 are extended from their respective support brackets 110 at different lengths to accommodate a difference in height between adjacent retention lobes 72 on the protrusion 70. The end portion 130 includes a flange or structural guide 132 that engages or fits within the retention lobe 72. The flange 132 enables the milling device 96 to maintain an axial position relative to the longitudinal axis 36. The end portion 130 is frictionless. The frictionless end portions 130 (along with the rollers 120) enable movement in the circumferential direction 34 along the inner surface 46 of the casing 42 in response to a force exerted by an operator. Thus, the milling device 96 acts as a sled-style milling device. The milling device 96 may be interchangeably coupled to different sets of end portions 130. Each set of end portions 130 may include structural guides 132 that are specifically shaped or sized to engage structural features 66 of different sizes and/or shapes. This (along with the adjustability of the frame assembly 98) enables the milling device 96 to be coupled to different structural features 66 on any type of circular or semi-circular casing 42 (including those with inner surfaces 46 that are damaged, warped, or worn).

FIGS. 9-12 depict a milling device 134 being utilized to machine the slot 45 along the inner surface 46 of the casing 42. The casing 42 and its features are as described with reference to FIG. 5. The milling device 134 includes a frame assembly 136 and a milling cutter or bit 138 (e.g., end mill cutter) coupled to the frame assembly 136 that machines the slot 45. The milling device 134 may be interchangeably coupled to different milling cutters (e.g., roughing end mill, finishing end mill, square end mill, ball end mill, etc.). The milling cutter 138 may be coupled to an electric motor drive coupled to a power source (not shown) disposed within the housing 140. The milling device 134 may include one or more handles 142 for the operator to displace the milling device in the circumferential direction 34. One of the handles 142 may include an actuator 144 (e.g., trigger) for actuating the milling cutter 138. The milling device 134 may also include instrumentation 146 for inspection of the machining of the slot 45.

The frame assembly 136 includes a pair of bars 148 and a first pair of rails 150 and a second pair of rails 152 coupled (e.g., clamped) to the bars 148 via fasteners 154, 156 (e.g., bolts). The bars 148 extend in the axial direction 30 and the rails 150, 152 in the circumferential direction 34. The first pair of rails 150 flank the second pair of rails 152. The rails 150, 152 are adjustable in the axial direction 30 along the bars 148. This enables the frame assembly 136 to be adjusted to the structural features 66 along the inner surface 46 of the casing 42.

A plate 158 is coupled to the first pair of rails 150 via fasteners 160 (e.g., bolts). A plate 162 is coupled the plate 158 via brackets 164 fastened to the plate 158 via fasteners 166 (e.g., bolts). The milling cutter 138 is coupled to a drive (not shown) within the housing 140 that extends through both of the plates 158, 162. The milling cutter 138 is disposed within a slot 168 on the plate 158. The slot 168 extends in the axial direction 30. Each plate 158, 162, is coupled to a respective threaded receptacle 170, 172. The threaded receptacles 170, 172 are vertically aligned with each other in the axial direction 30. An actuator 174 (e.g., knob screw) extends through the receptacles 170, 172. The actuator 174 includes a knob 176 and a threaded portion 178. The threaded portion 178 interfaces within the threaded portion of the receptacles 170, 172. Actuation (e.g., rotation) of the actuator 174 adjusts a position of the plate 162 with respect to the plate 158 in the axial direction 30, which adjusts the axial position of the milling cutter 138 within the slot 168.

Figure 10:
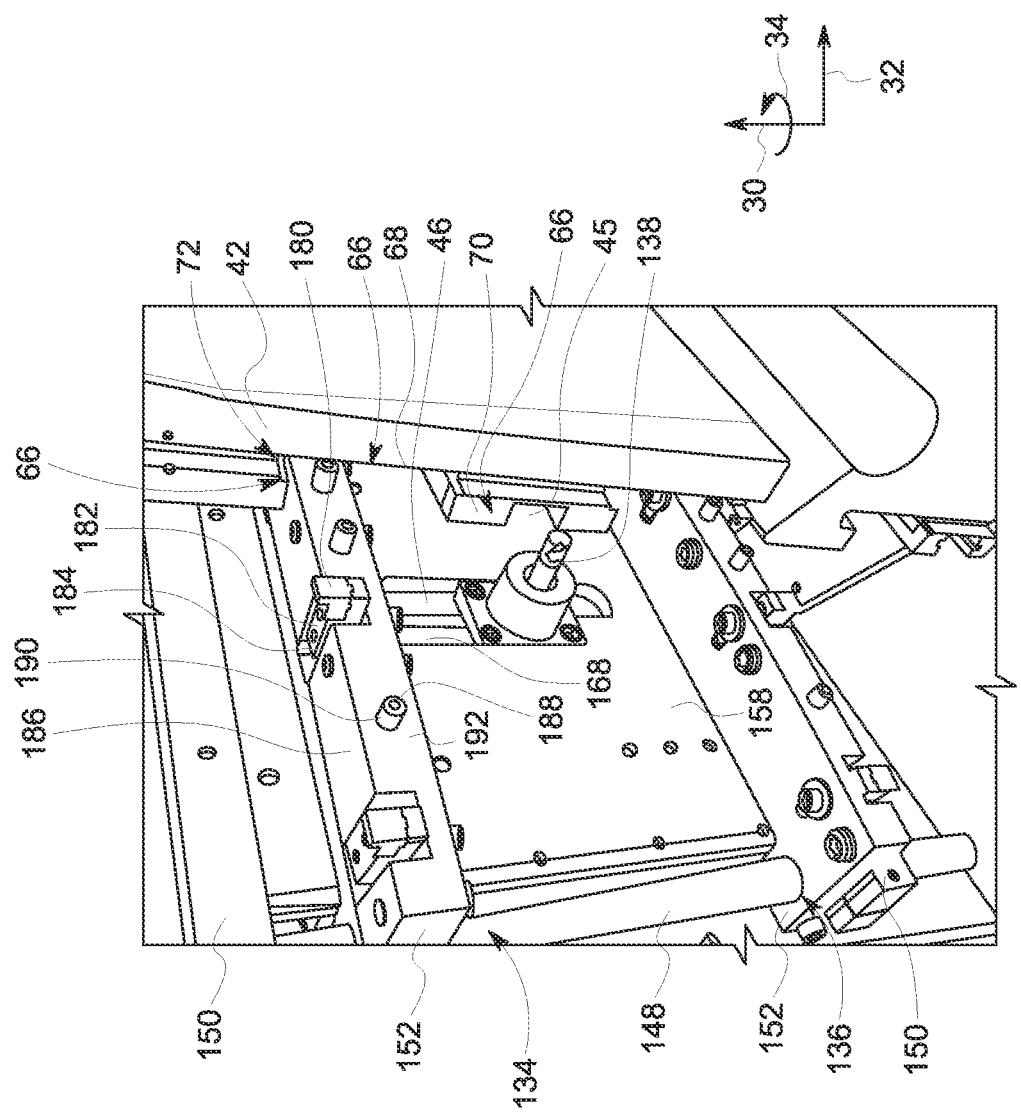
FIG. 10 is a rear perspective view of the milling device being utilized to machine the slot in FIG. 9.
Figure 11:
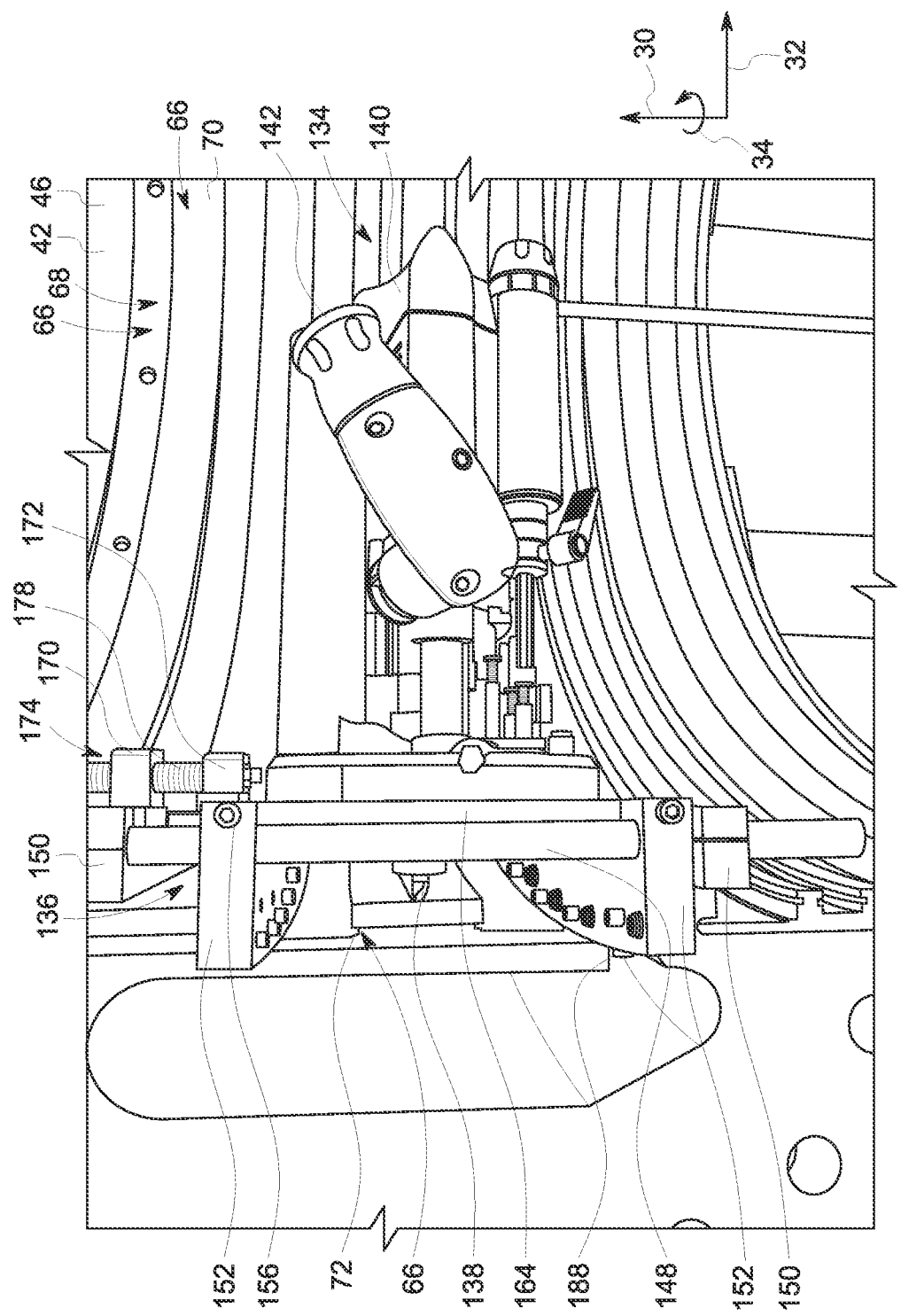
FIG. 11 is a side view of the milling device being utilized to machine the slot in FIG. 9.
Figure 12:
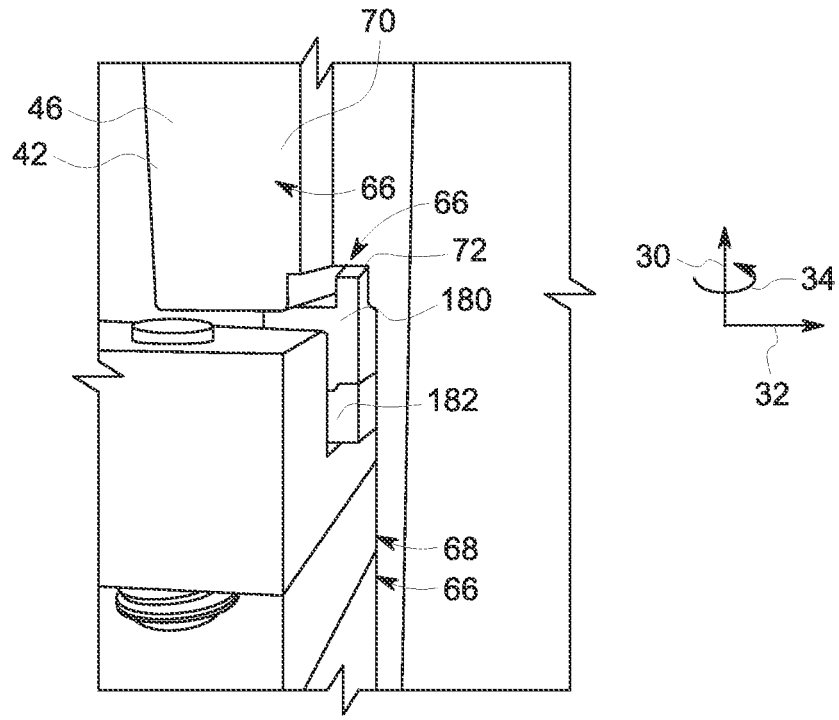
FIG. 12 is a side view of a portion of the milling device of FIG. 9 (e.g., of a structural guide)

As shown in FIG. 10, the milling device 134 includes structural guides 180 coupled to the rails 152. The number of structural guides 180 on each rail 152 may vary (e.g., 2, 3, 4, 5, or more structural guides 180). The structural guides 180 are configured to engage the structural features 66 (e.g., retention lobes 72) on the protrusion 70 to maintain an axial position (e.g., relative to the longitudinal axis 36) of the milling device 134. The structural guides 180 are respectively coupled to bracket supports 182 that are coupled to the rails 152 via fasteners 184 (e.g., bolts). As depicted, the structural guides 180 are disposed on outer surfaces 186 of the rails 82 to engage the retention lobes 72 disposed on the protrusions 70 flanking the protrusion 70 where the slot 45 is being machined. As depicted, the structural guide 180 has an L-shape. The milling device 134 may be interchangeably coupled to the different sets of structural guides 180. Each set of structural guides 180 may be specifically shaped or sized to different structural features 66 of different sizes and/or shapes. This (along with the adjustability of the frame assembly 136) enables the milling device to be coupled to different structural features 66 on any type of circular or semi-circular casing 42 (including those with inner surfaces 46 that are damaged, warped, or worn).

The milling device 134 also includes frictionless support structures 188 that interface (e.g., contact) with the inner surface 46 of the casing 42 (e.g., within slots 68). The frictionless support structures 188 are spring loaded frictionless pins 190 (e.g., made of plastic, graphite, or some other frictionless material). As depicted, the frictionless support structures 188 extend from a bottom surface 192 of the rails 152. The frictionless support structures 188 provide a supporting force in a direction (e.g., radial direction 32) perpendicular to the longitudinal axis 36. In addition, the frictionless support structures 188 are wear compensating. In particular, the springs of the spring loaded frictionless pins 190 enables the frictionless support structures 188 to wear or be consumed without changing the setup or precision of the system. Further, the frictionless support structures 188 enable movement in the circumferential direction 34 along the inner surface 46 of the casing 42 in response to a force exerted by an operator. Thus, the milling device 134 acts as a sled-style milling device. The small size and the light weight of the milling device 134 enables the milling device 74 to be utilized by a single person to machine the slot 45.

Figure 13:
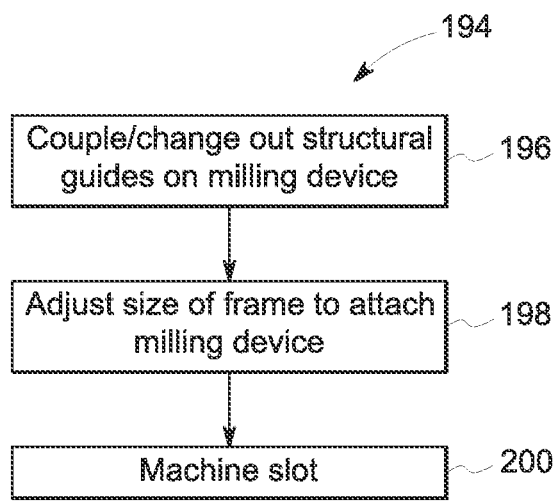
FIG. 13 is a flow chart of a method for utilizing a milling device to machine a slot along an inner surface of a casing.

FIG. 13 is a flow chart of a method 194 for utilizing a milling device (e.g., milling devices 74, 96, 134) to machine a slot along an inner surface of a casing of a gas turbine engine. The method 194 includes coupling structural guides on a frame assembly of the milling device (block 196). As noted above, the structural guides enable the milling device to engage structural features on the inner surface of the casing of the gas turbine engine to maintain an axial position (e.g., relative to the longitudinal axis of the casing) of the milling device. In certain embodiments, if structural guides are already coupled to the milling device, the structural guides may be changed out for another set of structural guides having a different size and/or shape. The method 194 also includes adjusting a size of the frame assembly to attach the milling device to the inner surface of the casing utilizing the structural features on the inner surface (block 198). The method 194 further includes machining the slot into the inner surface of the casing utilizing the milling device (block 200). The milling device is pushed in a circumferential direction about the inner surface of the casing.

Technical effects of the disclosed embodiments include providing a milling device that is configured to machine a circumferential slot along an inner surface of a casing of a gas turbine engine. The architecture of the milling device enables it to be adapted to and utilized on the inner surface of any casing (e.g., circular or semi-circular casing) of a gas turbine engine that has casing features near an area to be milled. The milling device also enables precise alignment of the milling or cutting tool to create the circumferential slot utilizing the casing features. The milling device may even be utilized on casings that are damaged, warped, or worn. In addition, the milling device is highly transportable due to its small size and light weight and may be utilized by a single person to machine the slot.

This written description uses examples to disclose the disclosed subject matter, including the best mode, and also to enable any person skilled in the art to practice the disclosed subject matter, including making and using any devices or systems and performing any incorporated methods. The patentable scope of the disclosed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A milling device for machining a slot into an inner surface of a casing for a gas turbine engine, comprising:
   a frame assembly comprising a plurality of structural guides configured to engage structural features on the inner surface of the casing to maintain an axial position of the milling device relative to a longitudinal axis of the casing; and
   a milling cutter coupled to the frame assembly;
   wherein the milling device is configured to be displaced in a circumferential direction relative to the longitudinal axis to machine the slot, via the milling cutter, along the inner surface of the casing in the circumferential direction,
   wherein the frame assembly is adjustable in both an axial direction and a radial direction relative to the longitudinal axis of the casing;
   wherein the frame assembly further comprises a plate oriented in the radial direction, a pair of support brackets coupled to the plate, and a pair of support arms coupled to the plate via the pair of support brackets, and both the pair of support brackets and the pair of support arms extend away from the plate, wherein the milling cutter is coupled to the plate, and wherein both the pair of support brackets and the pair of support arms flank the plate;

wherein the frame assembly is adjustable in size; and wherein the plate comprises a first set of slots and a second set of slots flanking the milling cutter, the pair of support brackets comprises a first support bracket and a second support bracket, the first support bracket and the second support bracket are respectively coupled to the first set of slots and the second set of slots, and a width between the pair of support arms in the axial direction is configured to be adjusted via adjusting respective positions of the pair of support brackets along the first set of slots and the second set of slots.

2. The milling device of claim 1 wherein the pair of supports arms comprises a first support arm and a second support arm, the first support arm comprises a third set of slots, the second support arm comprises a fourth set of slots, the first support bracket and the second support bracket are respectively coupled to the third set of slots and the fourth set of slots, and a vertical position of the milling cutter in the radial direction and a depth of the slot are configured to be adjusted via adjusting respective positions of the pair of support brackets relative to the pair of support arms along the third set of slots and the fourth set of slots.

3. The milling device of claim 1, wherein the frame assembly comprises rollers coupled to the pair of support arms, and the rollers are configured to enable movement of the milling device in the circumferential direction.

4. The milling device of claim 1, wherein the frame assembly comprises a plurality of support structures coupled to the pair of support brackets, and the plurality of structural guides is coupled to the plurality of support structures.

5. The milling device of claim 4, wherein the plurality of support structures is configured to be adjusted in the radial direction relative to the pair of support brackets.

6. The milling device of claim 5, wherein the plurality of support structures comprises a first support structure and a second support structure, the first support structure and the second support structure are respectively coupled to the first support bracket and the second support bracket, and the first support structure and the second support structure are configured to be adjusted differently in the radial direction relative to the first support bracket and the second support bracket to accommodate for a difference in height between the structural features.

7. The milling device of claim 5, wherein each support structure of the plurality of support structures comprises a stem portion and an end portion.

8. The milling device of claim 7, wherein the stem portion is configured to move in the radial direction within a respective recess of a respective support bracket of the pair of support brackets.

9. The milling device of claim 8, wherein the end portion comprises a respective structural guide of the plurality of structural guides configured to fit within a respective structural feature on the inner surface of the casing.

10. The milling device of claim 4, wherein the plurality of support structures is configured to provide a supporting force in a direction perpendicular to the longitudinal axis of the casing.

11. The milling device of claim 1, wherein the structural features on the inner surface of the casing comprise slots extending in the circumferential direction.

12. A milling device for machining a slot into an inner surface of a casing for a gas turbine engine, comprising:

a frame assembly comprising a plurality of structural guides configured to engage structural features on the inner surface of the casing to maintain an axial position of the milling device relative to a longitudinal axis of the casing; and a milling cutter coupled to the frame assembly; and wherein the milling device is configured to be displaced in a circumferential direction relative to the longitudinal axis to machine the slot, via the milling cutter, along the inner surface of the casing in the circumferential direction, wherein the frame assembly is adjustable in both an axial direction and a radial direction relative to the longitudinal axis of the casing, the axial direction extending parallel to the longitudinal axis of the casing, and the radial direction extending radially from the axial direction;

wherein the frame assembly further comprises a plate oriented in the radial direction, a pair of support brackets coupled to the plate, and a pair of support arms coupled to the plate via the pair of support brackets, and both the pair of support brackets and the pair of support arms extend away from the plate, wherein the milling cutter is coupled to the plate, and wherein both the pair of support brackets and the pair of support arms flank the plate;

wherein a width between the pair of support arms in the axial direction is configured to be adjusted via adjusting respective positions of the pair of support brackets;

wherein the frame assembly further comprises a plurality of support structures that are adjustable in the radial direction relative to the pair of support brackets, wherein each of the plurality of support structures comprises a respective stem portion and a respective end portion, and each of the plurality of structural guides being coupled to a respective one of the plurality of support structures; and wherein each of the plurality of support structures is coupled to a respective one of the pair of support brackets such the stem portion of each of the plurality of support structures is configured to move in the radial direction within a respective recess of the respective one of the pair of support brackets.

* * * * *